United States Patent
Burns et al.

(10) Patent No.: US 6,938,056 B2
(45) Date of Patent: Aug. 30, 2005

(54) SYSTEM AND METHOD FOR RESTORING A FILE SYSTEM FROM BACKUPS IN THE PRESENCE OF DELETIONS

(75) Inventors: Randal Chilton Burns, Washington, DC (US); Darrell D. E. Long, Soquel, CA (US); Robert Michael Rees, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 438 days.

(21) Appl. No.: 10/082,437

(22) Filed: Feb. 22, 2002

(65) Prior Publication Data

US 2003/0163493 A1 Aug. 28, 2003

(51) Int. Cl.[7] ............................................. G06F 17/30
(52) U.S. Cl. ............................................. 707/202; 707/204
(58) Field of Search ................................. 707/200–205; 714/15, 20

(56) References Cited

U.S. PATENT DOCUMENTS

| | | | | |
|---|---|---|---|---|
| 5,649,196 A | * | 7/1997 | Woodhill et al. | 707/204 |
| 5,720,026 A | * | 2/1998 | Uemura et al. | 714/6 |
| 5,974,563 A | * | 10/1999 | Beeler, Jr. | 714/5 |
| 6,073,128 A | * | 6/2000 | Pongracz et al. | 707/3 |
| 6,088,694 A | | 7/2000 | Burns et al. | 707/8 |
| 6,453,325 B1 | * | 9/2002 | Cabrera et al. | 707/204 |
| 6,665,815 B1 | * | 12/2003 | Goldstein et al. | 714/20 |
| 2003/0097611 A1 | * | 5/2003 | Delaney et al. | |

OTHER PUBLICATIONS

"Server Independent Restores in Disaster Recovery Scenarios," Veritas NetBackup Technical Overview, printed from the Internet at URL: www.veritas.com, on Mar. 16, 2002.

\* cited by examiner

*Primary Examiner*—Greta Robinson
*Assistant Examiner*—Debbie M. Le
(74) *Attorney, Agent, or Firm*—Samuel A. Kassatly

(57) ABSTRACT

"A system and associated method restore a file system from incremental backups in the presence of deletion, without restoring deleted files. This is accomplished by logging deletions in a deletion log. Using the deletion log, the system re-deletes the deleted files upon a restore operation to an incremental backup epoch. The system the logs deletions so that the files that were deleted and survived a backup epoch have their records logged. The activity log enables an incremental backup from a prior snapshot, and represents a point-in-time version of the file system. The system can either not restore the deleted files, or, alternatively, it can restore the deleted files and then re-deletes them."

19 Claims, 6 Drawing Sheets

SYSTEM AND METHOD FOR RESTORING A FILE SYSTEM FROM BACKUPS IN THE PRESENCE OF DELETIONS

FIELD OF THE INVENTION

This invention relates generally to systems for the storage of data objects, and particularly to efficiently managing access and control over data that is stored remotely in a file system or other object repository. More specifically, the present invention relates to a system and associated method for restoring a file system from incremental backups in the presence of deletion, without restoring deleted files.

BACKGROUND OF THE INVENTION

Data is typically maintained for storage and retrieval in computer file systems, wherein a file comprises a named collection of data. A file management system provides a means for accessing the data files, for managing such files and the storage space in which they are kept, and for ensuring data integrity so that files are kept intact and separate. Applications (software programs) access the data files through a file system interface. However, management of computer data using file management systems can be difficult since such systems do not typically provide sufficient information on the characteristics of the files (information called metadata).

In general, a file management system or file system is used to store data on computer systems. In general, file systems store data in a hierarchical name space. Files are accessed, located, and referenced by their unique name in this hierarchical name space.

As part of its file/data management function, a file system performs many automatic backup and copying operations to ensure data integrity and recoverability. Backing up data has become an integral part of safe computing, and is not merely reserved for mission critical applications.

Current computer users rely heavily on sophisticated backup and recovery solutions to ensure data access and integrity. For desktop systems, backup can be implemented on numerous data storage systems including diskettes, hard drives, magnetic tapes, optical drives, CDRs (writable compact disks), CDRWs (re-writable compact disks), or high capacity removable magnetic media. For networked computers, backup can span the network to larger drives on a file server, tape, or optical backup systems.

Two backup systems are commonly used: incremental backup, and full backup. Incremental backup is implemented by taking snapshots of the file system, that is a sequence of complete images of the file system, at predetermined intervals, and assessing the changes from one to the other. When two consecutive snapshots are deemed to be non-identical, the backup software is prompted to backup the modified or created files. Thus, only the files that have changed since the last backup are backed up. On the other hand, a full backup entails creating an image of the entire file system regardless of changes that were made to the file system.

There is still an unsatisfied need for a file management system that provides accurate disaster recovery from file-level incremental backups in the presence of deletions.

SUMMARY OF THE INVENTION

The present invention describes a system and associated method that satisfy this need. It is one feature of the present invention to provide a system and method for restoring a file system from first-level incremental backups in the presence of deletion, without restoring deleted files.

The foregoing and other features and objects of the present invention are realized by a system that implements a method or algorithm for accurate disaster recovery (i.e., point in time restore of a file system) from file-level incremental backups in the presence of deletions. This is accomplished by logging the deletions in a deletion log. Using the deletion log, the system re-deletes the deleted files upon a restore operation to an incremental backup point-in-time epoch.

The system logs deletions so that files that were deleted and survived a backup epoch have their recordslogged. The activity log thus enables an incremental backup from a prior snapshot, and represents a point-in-time version of the file system. The system can either not restore the deleted files, or, alternatively, it can restore the deleted files and then re-deletes them.

It should be noted that "time" in a log is implicit and/or logical. There is no timestamp in a log. A log records ordered events and the order in which they occur is encoded by their position in the log.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
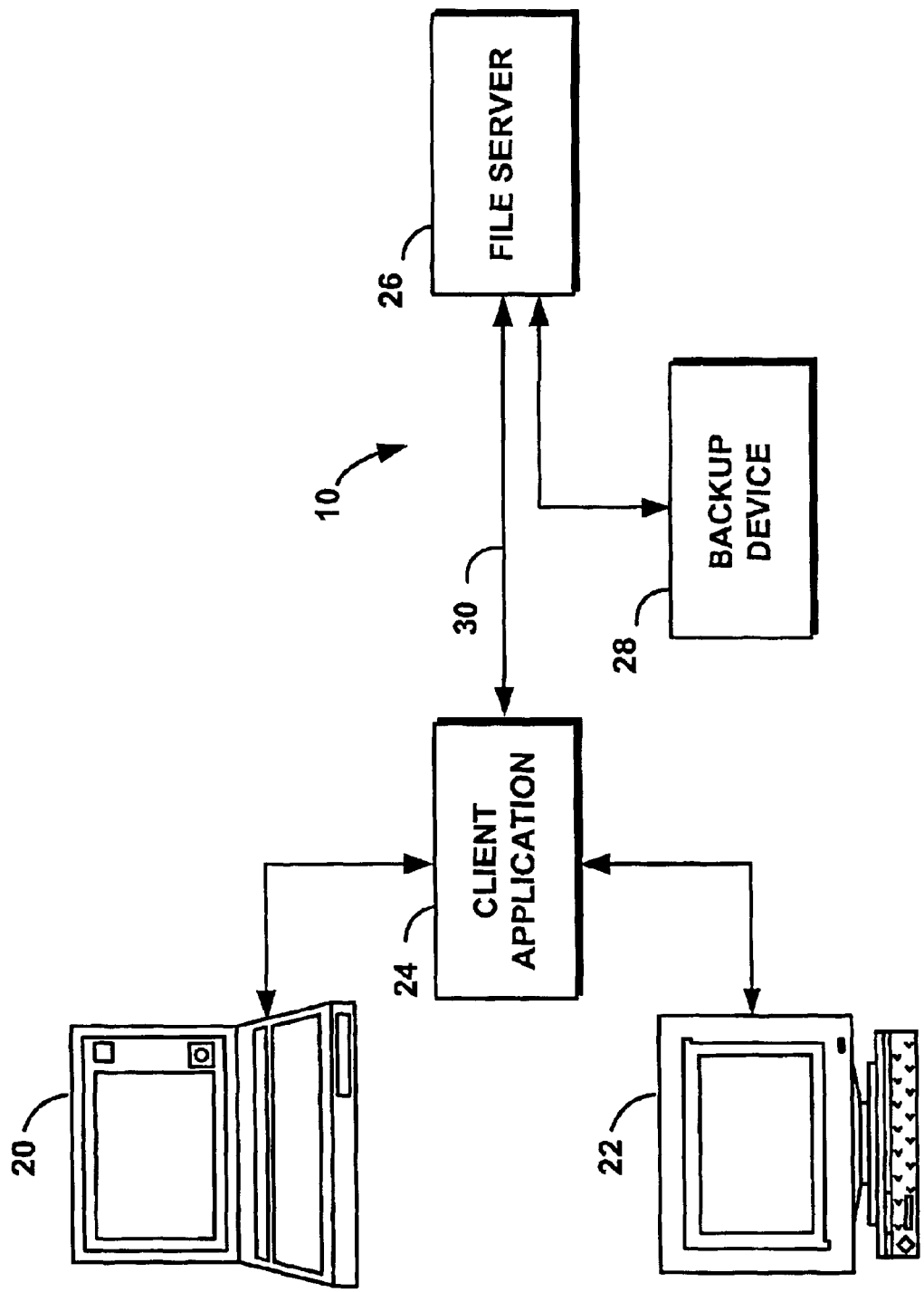
FIG. 1 is a block diagram representation of a computing system constructed in accordance with the present invention.

FIG. 1 is a block diagram representation of a computing system 10 constructed in accordance with the present invention. In one embodiment of the system 10, a client or user, represented by a computer 20, uses a client application 24 to create a file with a filename in a file server 26, and stores the file in a backup system 28. At some future point in time, the same user 20, or another user represented by a remote or networked computer 22, accesses the stored file by means of the client application 24 over a file communication path 30. While only two users 20, 22 are illustrated herein, it should be clear that many more users can access and use the system 10 either separately or concurrently.

Figure 2:
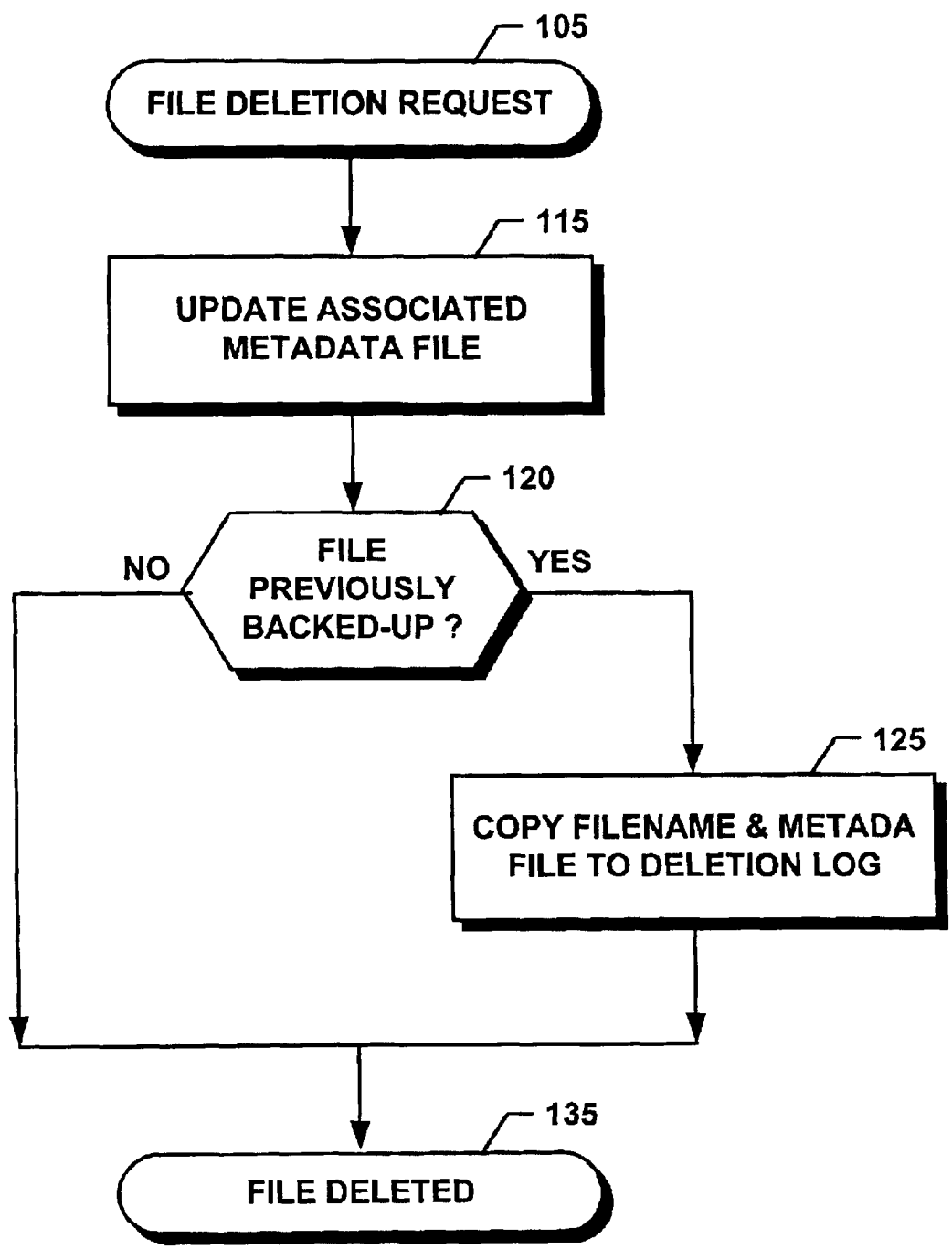
FIG. 2 is a process flow chart that illustrates a file deletion operation implemented by the computing system of FIG. 1.
Figure 3:
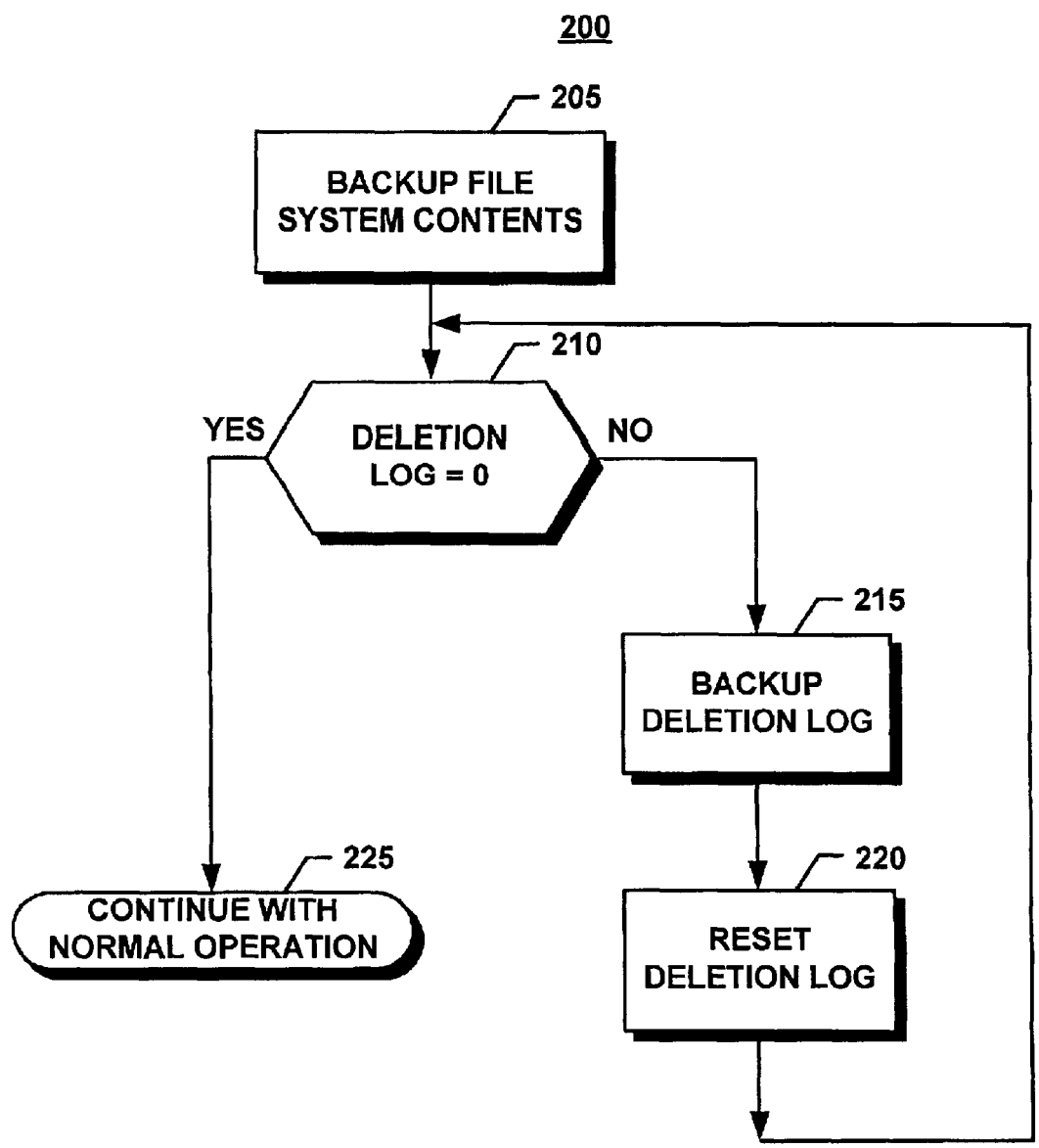
FIG. 3 is a process flow chart that illustrates a backup operation implemented by the computing system of FIG. 1 in the presence of file deletions depicted by FIG. 2.
Figure 5:
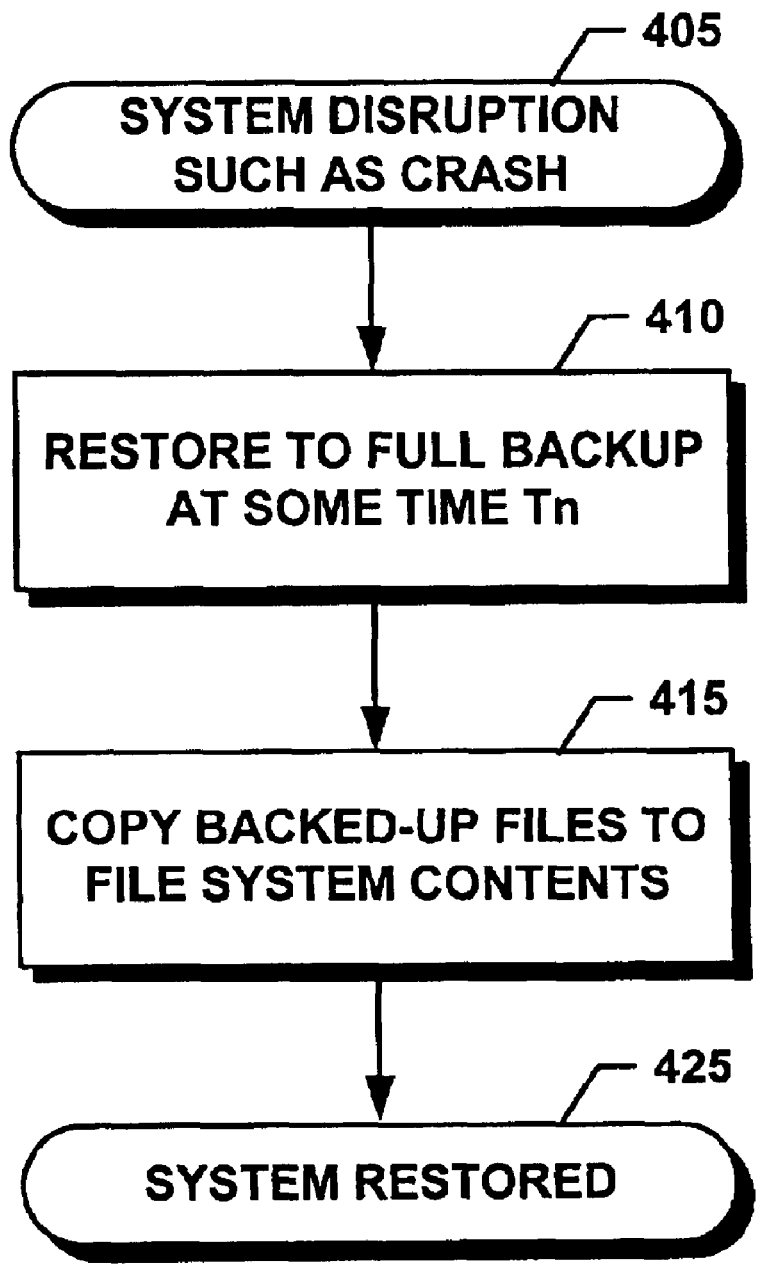
FIG. 5 is a process flow chart that illustrates a restore operation from a full backup as implemented by the computing system of FIG. 1 in the presence of file deletions depicted by FIG. 2.
Figure 6:
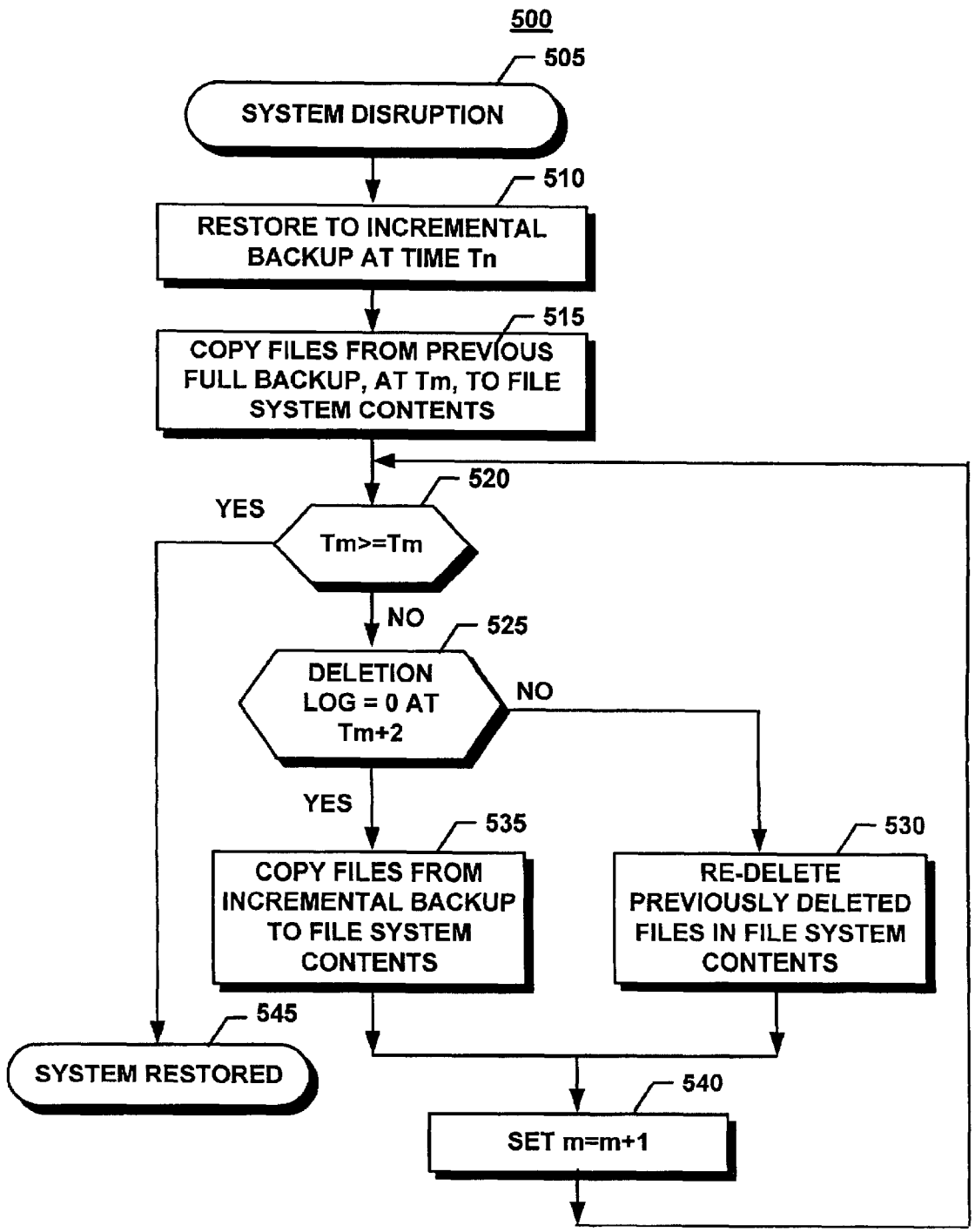
FIG. 6 is a process flow chart that illustrates a restore operation from an incremental backup as implemented by the computing system of FIG. 1 in the presence of file deletions depicted by FIG. 2.

Having accessed the file (or files), the user 20 can selectively perform any one or more of the following operations by means of the system 10, as it will be described later in greater detail:

File deletion operation (FIG. 2).
File system backup (FIGS. 3 and/or 4).
File system restore from a full backup (FIG. 5).
File system restore from an incremental backup (FIG. 6).

File Deletion Operation

FIG. 2 is a process flow chart that illustrates the steps executed by the computing system 10 of FIG. 1 to implement a file deletion operation 100, and further illustrates the step of flagging deleted files by creating a deletion backup log therefor. The process 100 is initiated at block 105 upon receiving a delete command from the user 20.

At step 115, the process 100 updates the metadata associated with the deleted file, and thereafter checks at decision block 120 if the deleted file has been backed-up in a previous epoch. Deletion events for the files that have survived a back-up epoch are recorded in a deletion log which are stored with the next epoch and are cleared from the deletion log at that time. Using a deletion log allows accurate restore by removing deleted files without comparing snap-shot images.

If the deleted file has been backed-up and a backup file has been created, the process 100 continues at step 125 and annotates the metadata with the deleted file to reflect the deletion of the file creating a deletion log for it.

The deletion log includes, for example, the file name and the metadata updated at step 125. In one embodiment, the deletion log is saved in the backup system 28 (FIG. 1), though in other embodiments the deletion log can be saved in a different storage location. The deletion log is an important aspect of the present invention in that it allows the restore operation to identify the deleted files that have been previously backed-up in order to re-delete them.

Subsequent to the creation of the deletion log, the process 100 notes the completion of the file deletion operation at step 135 as a log entry.

Returning to decision step 120, if the process 100 determines that the deleted file has not been backed-up, then it proceeds directly to step 135 without creating a deletion log for the deleted file.

File System Backup

In the next step of computing system operation, a first exemplary backup operation 200 is illustrated in FIG. 3. The backup process 200 starts at block 205 and instructs the system 10 to initiate a backup of the file system contents.

At decision step 210, the backup process 200 checks the deletion log for the presence of any deleted files. If the deletion log contains at least one entry, the process 200 proceeds to step 215 where it backs up the deletion log created at step 130 (FIG. 2). Preferably but not necessarily, the backup file of the deletion log is stored in the backup system 28, and independently from the file system content.

Subsequent to saving the deletion log backup file, the process 200 clears the deletion log at step 220, in preparation for future file deletion entries. Upon the execution of step 220, the backup process 200 returns to decision block 210 and checks for the presence of new file deletion entries since the backup operation 200 was initiated at step 205.

If the backup process 200 determines at decision step 210 that the deletion log does not contain any deletion entries, it allows the client application 24 to continue with its normal operation, at step 225, without backing up or clearing the deletion log.

Figure 4:
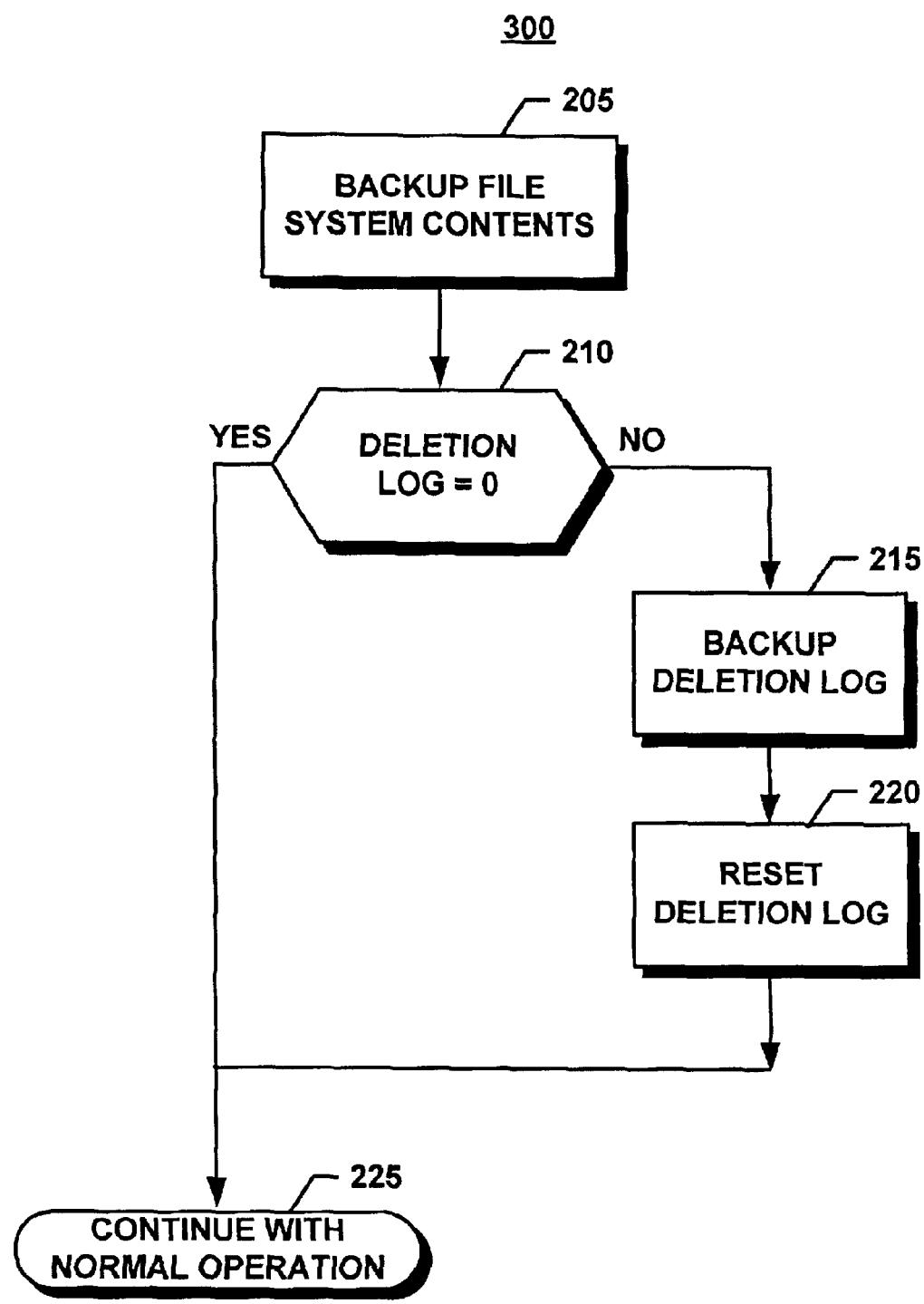
FIG. 4 is a process flow chart that illustrates an alternative backup operation implemented by the computing system of FIG. 1 in the presence of file deletions depicted by FIG. 2.

Referring to FIG. 4, it illustrates an alternative backup process 300 that is similar to the backup process 200 of FIG. 3 with similar reference numerals referring to similar steps. The backup process 300 differs from the backup process 200 in that subsequent to clearing the deletion log at step 220, the backup process 300 proceeds directly to step 225 rather than looping back to decision step 210 for rechecking the existence new deletions.

File System Restore from a Full Backup

Referring now to FIG. 5, it illustrates the steps of a restore operation 400 from a full file system backup. The restore operation 400 starts at step 405 by the occurrence of a system disruption step such as a system crash. The user issues a full system restore command at step 410, and the system 10 responds by restoring the file system to a full backup state at a predetermined time Tn, a time at which the system was previously fully backed-up.

The system 10 copies the backup files from the backup system 28 to the file system contents. Since at the time, Tn, of the full backup the deletion log has been cleared, there is no necessity to restore the deletion log as well. At step 420 the file system is restored to the full backup image created at time Tn.

File System Restore from an Incremental Backup

Referring to FIG. 6, it illustrates the steps of a restore operation 500 from an incremental backup. As with the restore operation 400 of FIG. 5, the restore operation 500 starts at step 505 by the occurrence of a system disruption step such as a system crash. The user issues a restore command to an incremental backup that was saved at time Tn (step 510).

At step 515, the process 500 copies the files from the last full backup image at time, Tm, prior to the desired incremental backup, to the file system contents. The process 500 then proceeds to decision step 520 where it checks the incremental backup time versus the time of incremental backup selected, Tn.

If the time criterion, Tn, is not satisfied, that is if time Tm is less than the desired time Tn (i.e., Tm has not yet reached Tn), the process 500 proceeds to decision step 525 where it checks the deletion log at time Tm+1, for the presence of any deleted files, where Tm+1 is the time at which the next incremental backup took place.

If the process 500 determines that the deletion log contains one or more entries, the process 500 continues to step 530 where it redeletes the files that have been previously deleted at time Tm+1 and deletes those files from the file system content. It being understood that the deleted files were restored with the full system backup restore step 515.

If the process 500 determines at decision step 525 that the deletion log does not contain any entry, the process 500 proceeds to step 535 where it copies files from the incremental back at time Tm+1 to the file system contents.

Following steps 530 and 535 described above, the process 500 proceeds to step 540 where it increments the incremental backup time pointer, and returns to decision step 520 for another iteration of file copying or re-deletion, as explained in connection with steps 520 through 540.

If at decision step 20 the process 500 determines that the time criterion, Tn, is satisfied, that is if time Tm is greater than or equal to the desired time Tn (i.e., Tm has reached or exceeded Tn), the process 500 continues to step 545 where it notes the completion of the desired system file restoration.

EXAMPLE

Table I, below, illustrates an exemplary use of the system 10. In chronological order, at time T0, a snapshot is taken of the file system contents and a full backup is made of files F1, F2, and F3. The deletion log ("DL") shows no entries.

TABLE I

| Action | File System Contents | Deletion Log | Backup |
|---|---|---|---|
| Snapshot Backup | F1, F2, F3 | 0 | Full: F1, F2, F3 |
| Create F4 | F1, F2, F3, F4 | 0 | None |
| Delete F2 | F1, F3, F4 | DL = NF2 + MDF2 | None |
| Snapshot Backup | F1, F3, F4 | 0 clears deletion log | Incremental: F4, DL = NF2 + MDF2 |
| Create F5 | F1, F3, F4, F5 | 0 | None |
| Delete F4 | F1, F3, F5 | DL = NF4 + MDF4 | None |
| Delete F5 | F1, F3 | DL = NF5 + MDF5 + NF4 +MDF4 | None |
| Snapshot Backup | F1, F3 | 0 clears deletion log | Incremental: DL = NF5 + MDF5 + NF4 + MDF4 |
| Delete F3 | F1 | DL = NF3 + MDF3 | None |
| Full Backup | F1 | 0 clears deletion log | Full: F1 |
| SYSTEM DISRUPTION | | | |

At time T1, a file F4 is created, but no deletions are made. The deletion log still shows no entries.

File F2 is deleted at time T2. This deletion is entered in the deletion log as DL=NF2+MDF2, wherein "N" represents the file name of the file, in this case file F2, and "MD" represents the metadata referencing the file, e.g. MDF2. The metadata of file F2 includes such information as the time the file was created, the author, the time it was saved, and so forth.

Another snapshot is taken at time T3, where file F4 is backed up incrementally, in that files F1, F2, and F3 were not changed since the last full backup. The deletion log (DL) is also backed up, and is then cleared.

At time T4, a new file, F5, is created. Now the file system content comprises F1, F3, F4, and F5. Since there are no deleted files, the deletion log contains no entries.

File F4 is deleted at time T5. The deletion, along with corresponding metadata, is registered in the data log as DL=NF4+MDF4.

File F5 is deleted at time T6. At time T7, a snapshot of the system file is taken. In response, the deletion of file F4 is logged and backed up incrementally, and the deletion log is cleared. It should be noted that the deletion of file F5, though logged at T6, is not backed-up at time T7, since file F5 did not survive a previous backup epoch. This is to prevent cluttering the log with useless information about temporary files.

At time T8, file F3 is deleted. The data log reflects the entry as DL=NF3+MDF3.

At time T9, a snapshot is taken, a full backup is effected, and the deletion log is cleared.

The file system crashes at time T10. At this point, there are several restoration options.

Example 1 follows the flowchart sequence of FIG. 5. The file system is restored to its backup status at time T9, the time of the last full backup. At time T9, there exists only one file entry, namely file F1. So the image of file F1 is resurrected from the backup media and written to the file system contents.

Example 2 is governed by the logic of the sequential flowchart in FIG. 6. The file system is restored to its backup status at time T7. However, at that time, there has been an incremental backup, thus a restoration to a full backup should be implemented first. In this example, it is the full backup at time T0. At that time, files F1, F2, and F3 are copied to the file system contents, and the incremental backup at time T2 is applied. Taking into consideration the deletion log DL=NF2+MDF2 as described earlier, system 10 re-deletes File F2. At time T3, an incremental backup is applied next, resurrecting a copy of file F4. However, the iteration of the recovery at time T7 re-deletes file F4 leaving only files F1 and F3 as they appear in the Table I entry for time T7.

It is to be understood that the specific embodiments of the present invention that have been described are merely illustrative of certain applications of the principle of the present invention. Numerous modifications may be made to the system 10 and associated methods 200, 300, 400, 500 400 described herein without departing from the spirit and scope of the present invention.

For example, while the present invention has been described in relation to a single user, it should be clear that more than one user can use the system 10 concurrently. As an illustration and with reference to FIG. 6, a user 20 can request a file system restoration to time, Tn, while another user 22 can request a file system restoration to a different time, Tx. As another illustration, the present invention is similarly applicable to files that have been renamed rather than deleted.

What is claimed is:

1. A method for restoring a file system from one or more incremental backups in the presence of deletion, without restoring a deleted file, comprising the steps of:
    deleting a file;
    logging a file deletion in a deletion log;
    updating metadata associated with the deleted file; and
    using the deletion log and the metadata, re-deleting the deleted file that has been previously backed-up, upon a restore operation to an incremental backup, to allow accurate restore by removing the deleted file without comparing snap-shot images.

2. The method of claim 1, further including the step of checking if the deleted file has been backed-up in a previous incremental backup.

3. The method of claim 2, wherein the step of deleting the file includes moving the file designated for deletion from a file server to an allocated memory in a backup system.

4. The method of claim 2, wherein, in the restore operation, if the deleted file has been backed-up and a backup file has been created, annotating the metadata to reflect the deletion of the file.

5. The method of claim 4, wherein the step of logging the file deletion in the deletion log includes logging a file name and annotated metadata.

6. The method of claim 5, wherein if the deleted file has not been backed-up, proceeding with the restore operation without creating a deletion log for the deleted file.

7. The method of claim 6, further including the step of checking the deletion log for an entry indicative of a deleted file.

8. The method of claim 7, wherein if the deletion log contains at least one entry, backing up the deletion log.

9. The method of claim 8, further including, subsequent to the step of backing up the deletion log, clearing the deletion log in preparation for future file deletion entries.

10. The method of claim 9, wherein if the deletion log does not contain a deletion entry, implementing a client application without backing up the deletion log.

11. A system for restoring a file system from one or more incremental backups in the presence of deletion, without restoring a deleted file, comprising:

means for deleting a file;

means for logging a file deletion in a deletion log;

means for updating metadata associated with the deleted file; and means for using the deletion log and the metadata, re-deleting the deleted file that has been previously backed-up, upon a restore operation to an incremental backup, to allow accurate restore by removing the deleted file without comparing snap-shot images.

12. The system of claim 11, further including means for checking if the deleted file has been backed-up in a previous incremental backup.

13. The system of claim 12, wherein the means for deleting the file moves the file designated for deletion from a file server to an allocated memory in a backup system.

14. The system of claim 12, further including means for annotating the metadata to reflect the deletion of the file in the restore operation, if the deleted file has been backed-up and a backup file has been created.

15. The system of claim 14, wherein the file deletion log includes a file name and annotated metadata.

16. The system of claim 14, further including means for backing up the deletion log if the deletion log includes an entry indicative of a deleted file.

17. The system of claim 14, further including means for clearing the deletion log in preparation for future file deletion entries.

18. A computer program product for restoring a file system from one or more incremental backups in the presence of deletion, without restoring a deleted file, comprising:

means for deleting a file;

means for logging a file deletion in a deletion log;

means for updating metadata associated with the deleted file; and means for using the deletion log and the metadata, re-deleting the deleted file that has been previously backed-up, upon a restore operation to an incremental backup, to allow accurate restore by removing the deleted file without comparing snap-shot images.

19. The computer program product of claim 18, further including means for checking if the deleted file has been backed-up in a previous incremental backup.

* * * * *